United States Patent [19]

Bates

[11] Patent Number: 5,131,689
[45] Date of Patent: Jul. 21, 1992

[54] FLEXIBLE NON-METALLIC COUPLING WITH CAM FOLLOWER LATCH MECHANISM

[75] Inventor: James I. Bates, Wolverhampton, England

[73] Assignee: Marston Palmer Limited, England

[21] Appl. No.: 500,513

[22] Filed: Mar. 28, 1990

[30] Foreign Application Priority Data

Mar. 28, 1989 [GB] United Kingdom ............... 8906949

[51] Int. Cl.5 ............................................. F16L 35/00
[52] U.S. Cl. ..................................... 285/87; 285/233; 285/261; 285/348; 285/92
[58] Field of Search ............... 285/347, 371, 372, 418, 285/231, 232, 233, 348, 356, 372, 307, 82, 92, 87

[56] References Cited

U.S. PATENT DOCUMENTS

| | | | |
|---|---|---|---|
| 2,755,109 | 7/1956 | Risley | 285/232 |
| 2,758,852 | 8/1956 | Newell | 285/232 X |
| 2,787,479 | 12/1956 | Burns | 285/232 |
| 3,223,438 | 6/1960 | Cenzo et al. | 285/347 X |
| 3,285,631 | 6/1963 | Stolpmann | 285/918 X |
| 4,522,433 | 6/1985 | Valentine et al. | 285/233 X |
| 4,548,427 | 10/1985 | Press et al. | 285/347 X |
| 4,572,551 | 2/1986 | Jaquette | 285/347 X |
| 4,621,840 | 11/1986 | Foster | 285/233 X |
| 4,691,944 | 9/1987 | Viall, Jr. | 285/348 |
| 4,735,440 | 4/1988 | Sauer | 285/347 X |
| 4,775,173 | 10/1988 | Sauer | 285/347 X |
| 4,822,082 | 4/1989 | Phillips | 285/348 X |
| 4,886,304 | 12/1989 | Kunsman | 285/372 X |

Primary Examiner—Randolph A. Reese
Assistant Examiner—Timothy Aberle
Attorney, Agent, or Firm—Cushman, Darby & Cushman

[57] ABSTRACT

A flexible non-metallic coupling comprising an outer ring member having an internal bore with a pair of 'O' rings carrying internal inserts slidable and rotatable within the bore, each insert being secured to a pipe end by a shape memory alloy ferrule and being retained in the bore by a nut.

8 Claims, 2 Drawing Sheets

FLEXIBLE NON-METALLIC COUPLING WITH CAM FOLLOWER LATCH MECHANISM

BACKGROUND OF THE INVENTION

This invention relates to couplings and has particular reference to couplings for joining together two pipes.

SUMMARY OF THE INVENTION

By the present invention there is provided a pipe coupling comprising an outer ring member of plastics material having a smooth internal bore, one axial end of said outer ring having an external thread and the other end having an external thread, an enlarged diameter portion between the first and second ends, a pair of internal inserts of plastics material, each insert having at one end an internal bore adapted to be secured to the exterior of a pipe to be coupled, and at the other end a radially outwardly directed support surface, the support surface supporting an 'O' ring for fluid tight engagement with the smooth internal bore, the insert having at the one end an outwardly directed ferrule engagement surface, a ferrule surrounding and engaging the ferrule engagement surface, the ferrule being of shape memory alloy, there being an annular step between the smaller diameter one end and the larger diameter other end, there being a pair of nuts each threadably engageable with one end of the outer ring and having a step engaging inwardly directed flange to permit the nut to retain the ring and insert together.

The 'O' ring may be retained on the insert by a retaining or locking ring.

The nuts may be retained on the outer ring by a locking mechanism. The locking mechanism may comprise a latching member or follower adapted to expand over a latch or cam behind an enlarged portion of the outer ring. The enlarged portion may be provided with a camming surface on the side away from the enlarged diameter portion and may be provided with a camming surface on the other side.

The components of the coupling other than the shape memory alloy ferrule and the 'O' ring may be formed of a plastics material, such as Polyetheretherketone, polyether sulphone, polyphenylene sulphide or polyetherketone.

The radially outwardly facing surfaces of the insert and the retaining ring may be chamfered so that they have the greatest diameter immediately adjacent the 'O' ring. The step engaging portion of the nut may have an internal diameter larger than the external diameter of the ferrule, so that the inserts have a predetermined limited amount of angular movement relative to the outer ring.

There may be an annular washer between the step and the insert.

There may be a limited predetermined amount of axial movement of the insert in the outer ring.

The 'O' ring may be formed of an electrically conductive material.

BRIEF DESCRIPTION OF THE DRAWINGS

By way of example embodiments of the present invention will now be described with reference to the accompanying drawings of which

DESCRIPTION OF THE PREFERRED EMBODIMENT

Figure 1:
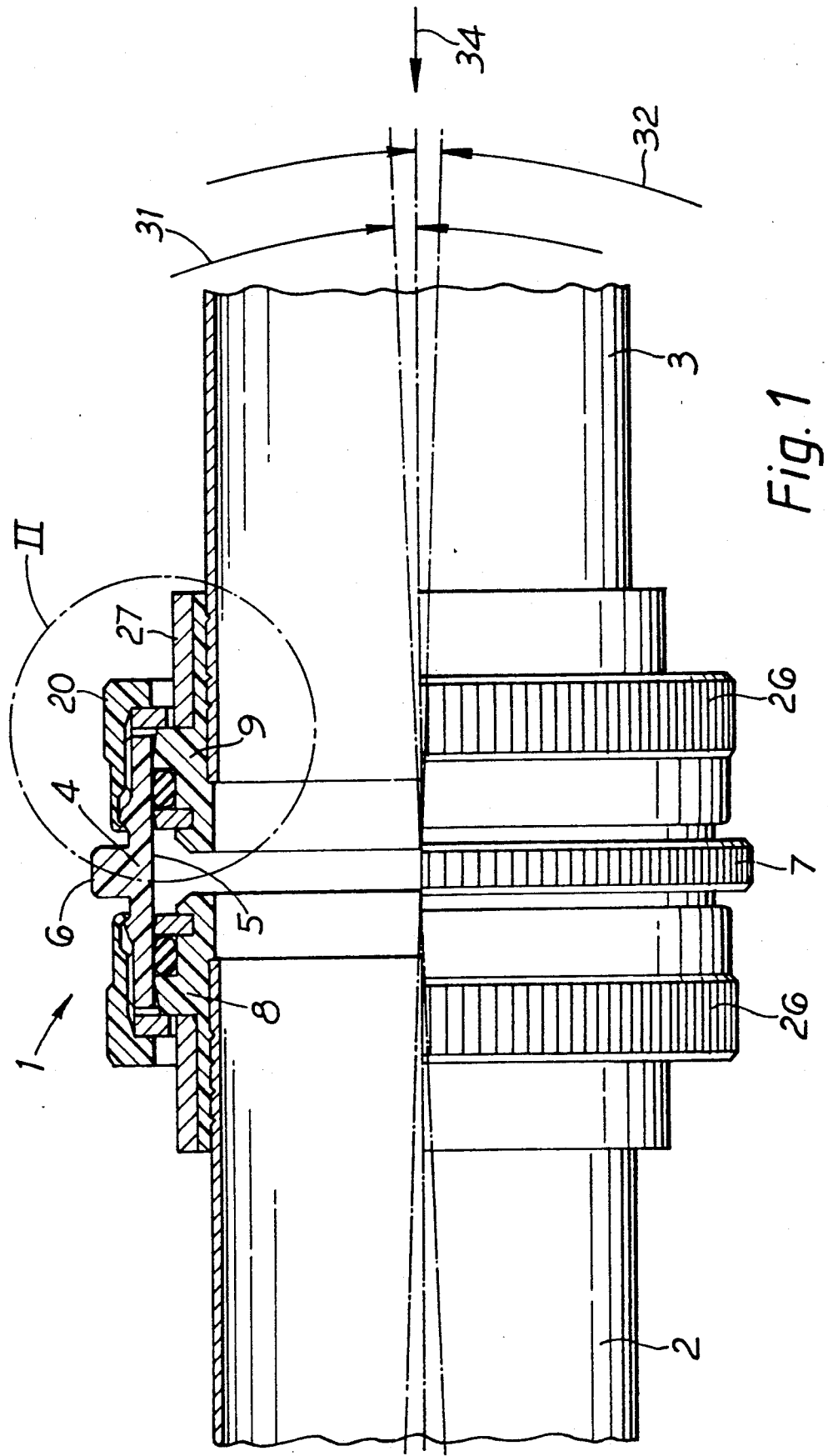
FIG. 1 is a side elevational view partly in section of a coupling in accordance with the present invention.
Figure 2:
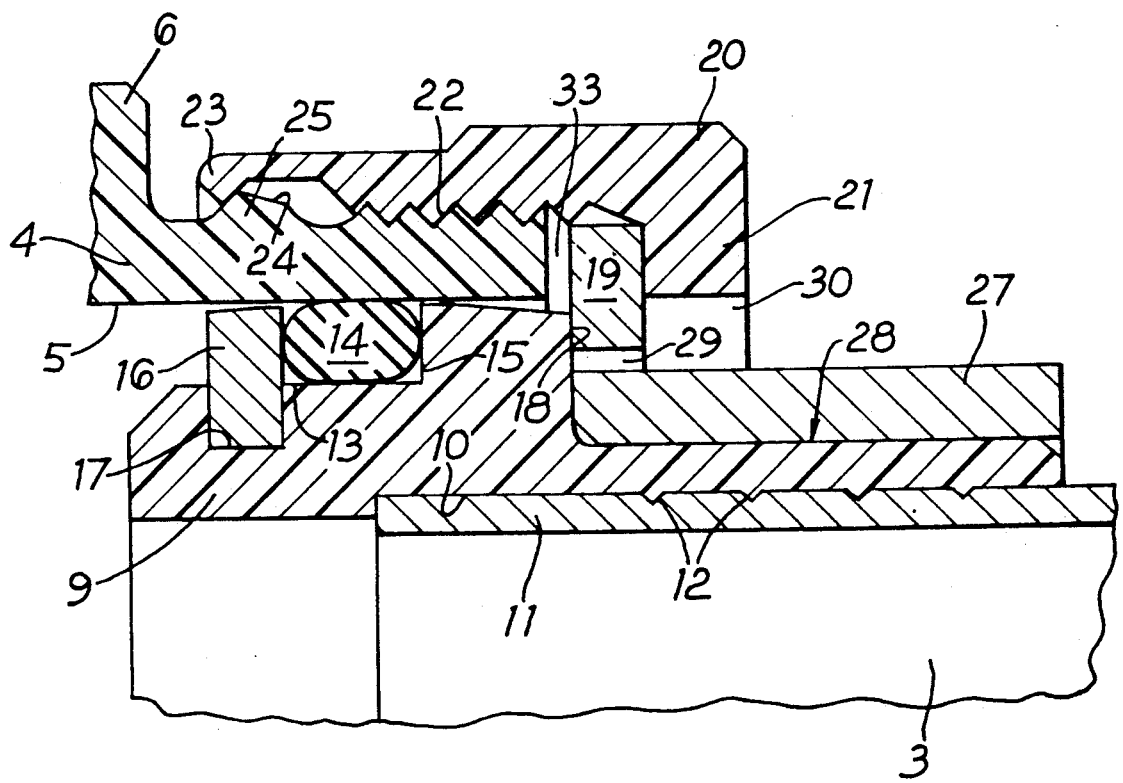
FIG. 2 is an enlarged view of the portion within the circle II of FIG. 1.

Referring to FIG. 1, this shows a pipe coupling generally indicated by 1 for connecting together two pipes 2, 3. The pipes 2, 3 may be conventionally metal pipes or may be composite material pipes and typically could be produced in a range of 5 to 100 mm in diameter. The pipe coupling 1 comprises an outer ring member 4 having a smooth internal bore 5 and an enlarged diameter portion 6. The enlarged diameter portion 6 is externally knurled as shown at 7. Located within each end of the smooth internal bore are a pair of insert members 8, 9. Each insert member includes an internal bore portion 10 adapted to be secured to the ends of the pipe such as end 11 of pipe 3. It can be seen that the insert portion is provided with ridges 12 to bite into and engage the pipe end 11.

There is also provided an outwardly directed support surface 13 for supporting an 'O' ring 14. An axially directed wall 15 supports the 'O' ring 14 on one side and a retaining ring 16 located in a groove 17 locates the 'O' ring on the other side. The insert 9 includes a shoulder or step 18 which is engaged by a thrust washer 19. A nut 20 having a radially inwardly directed flange 21 can be screwed onto the outer ring by means of a threaded portion 22. A latch member 23 formed integrally with nut 20 rides over the camming surface 24 of an enlarged portion 25 of the outer ring to lock the nut 20 onto the outer ring 4. The shape of the interengaging surfaces is controlled to ensure that the tightening torque is several times (eg 3 or 4 times) smaller than the breakaway torque. The nut 20 is also provided with a knurled surface as at 26.

A ferrule 27 of shape memory alloy is used to lock the internal insert 9 onto the pipe end 11.

It is preferred that the outer ring 4, the nut 20, the thrust washer and the inserts 8, 9 be formed of a suitable plastics material such as Polyetheretherketone or ABS or PES (polyethersulfone) or any other suitable engineering grade plastics material. Typically, the shape memory alloy may be a nickel titanium alloy (such as nitinol or Tinel) or a stainless steel shape memory alloy.

To assemble the coupling, the 'O' ring 14 is located on the surface 13 and the retaining ring 16 is snapped on to the insert 9. The shape memory alloy ferrule 27 is located over the outside surface 28 of the insert 9 and the assembled insert is then located over the end 11 of pipe 3. The shape memory alloy 27 is then activated in the conventional way by heating it to result in radial shrinkage of the shape memory alloy, thus locking the insert 9 formally onto the end 11 of pipe 3.

It will be noted that the outer diameters of both the locking ring 16 and the radially outwardly directed insert 9 are chamfered so that they have the greatest diameter immediately adjacent the 'O' ring 14. There is also an annular gap 29 between the thrust ring 19 and the ferrule 27 and an annular gap 30 between the inwardly directed flange 21 of the nut 20 and the ferrule 27. These arrangements permit a predetermined amount of angular movement between the pipe ends and the outer ring 4 as shown at 31 and 32. A 2° amount of movement is permissible in either direction.

It will also be seen that there is an axial gap 33 between the thrust ring 19 and the end face of the outer ring 4. This permits a limited amount of axial movement in the direction of arrow 34.

In all cases in the event of angular or axial movement, the 'O' ring seal 14, typically of electrically conductive material continues to seal on the smooth bore 5.

By selecting a plastics material such as Polyetheretherketone, the mass of the coupling can be minimised whilst retaining good mechanical, electrical, chemical and thermal properties. Polyetheretherketone retains high mechanical performance permitting continuous operation at temperatures of up to 250 ° C.

It will also be appreciated that the coupling can be disassembled and reassembled if required.

I claim:

1. A pipe coupling comprising an outer ring member of plastics material having a smooth internal bore, each axial end of said outer ring having an external thread, an enlarged diameter portion between the first and second ends, a cam means defined between each external thread and a respective end of said enlarged diameter portion, a pair of internal inserts of plastics material, each insert having an internal bore adapted to be secured to the exterior of a pipe to be coupled, and a radially outwardly directed support surface, the support surface supporting an 'O' ring for fluid tight engagement with the smooth internal bore, the insert having at the one end a radially outwardly directed ferrule engagement surface, a ferrule surrounding and engaging the ferrule engagement surface, the ferrule being of shape memory alloy, there being an annular step between the ferrule engagement surface and the remainder of each insert, there being a pair of nuts each threadably engageable with one end of the outer ring and having a step engaging inwardly directed flange to permit the nut to retain the ring and insert together, each said coupling nut including follower means for engaging said cam means when said nut is threaded onto the respective end of said outer ring.

2. A pipe coupling according to claim 1 in which the 'O' ring is retained on the insert by a retaining or locking ring.

3. A pipe coupling according to claim 2 wherein the radially outwardly facing surface of the insert and the retaining ring are chamfered such that both the insert and the retaining ring have their greatest diameter immediately adjacent the 'O' ring.

4. A pipe coupling according to claim 1 wherein said follower means comprises a latching member adapted to expand over said cam means which is provided by an enlarged portion of said outer ring.

5. A pipe coupling according to claim 4 in which said enlarged portion is provided with a camming surface on the side away from the enlarged diameter portion.

6. A pipe coupling according to claim 1 in which the 'O' ring is formed from an electrically conductive material.

7. A pipe coupling according to claim 1 wherein the step engaging portion of each said nut has an internal diameter larger than the external diameter of the ferrule, so as to provide for a predetermined and limited amount of angular movement about the axis of the coupling of the insert relative to the outer ring member.

8. A pipe coupling according to claim 7 in which there is provided an annular washer or spacer between said step and said insert.

* * * * *